United States Patent [19]

Dellacato

[11] 3,755,654

[45] Aug. 28, 1973

[54] DIGITAL DECODING OF RETROSPECTIVE PULSE MODULATION

[75] Inventor: Francis Charles Dellacato, Lake Katrine, N.Y.

[73] Assignee: International Business Machines Corporation, Armonk, N.Y.

[22] Filed: July 31, 1972

[21] Appl. No.: 276,337

[52] U.S. Cl. ... 235/61.11 E, 340/146.3 Z, 329/104, 340/347 DD

[51] Int. Cl. ... G06k 7/00

[58] Field of Search ... 340/347 DD, 146.3 Z, 340/172.5, 174.1 H; 235/61.11 E, 61.11 D, 61.12; 329/104; 325/38 R; 250/219 WD

[56] References Cited

UNITED STATES PATENTS

| | | | |
|---|---|---|---|
| 3,716,699 | 2/1973 | Eckert, Jr. et al. | 235/61.11 E |
| 3,708,748 | 1/1973 | Nassimbene | 340/347 DD |
| 3,701,886 | 10/1972 | Jones | 235/61.11 E |
| 3,701,097 | 10/1972 | Wolff | 340/146.3 Z |
| 3,374,475 | 3/1968 | Gabor | 340/174.1 H |

*Primary Examiner*—Charles D. Miller
*Attorney*—E. Lester, M. H. Klitzman et al.

[57] ABSTRACT

A digital system for decoding data encoded by retrospective pulse modulation, wherein binary ones and zeros are represented by a comparison of the space between a first and second mark with the space between a second and third mark. A counter accumulates a current count representative of the elasped time between the sensing of a first mark and a second mark. This count is stored in a register as the previous count while a new current count is accumulated representative of the elapsed time between the sensing of the second mark and a third mark. Concurrent with the accumulation of the new current count, the ones complement of the previous count is loaded into a stepping counter, stepped until an end carry occurs, and then repeatedly reloaded and stepped until the new current count has been accumulated. If more than a predetermined number of end carries takes place during the accumulation of the new current count, a signal indicates that a long space is present between the second and third marks. The presence or absence of this signal, compared with its presence or absence after the second mark was sensed, is indicative of whether a binary one or a binary zero is represented.

8 Claims, 4 Drawing Figures

DIGITAL DECODING OF RETROSPECTIVE PULSE MODULATION

CROSS-REFERENCES TO RELATED APPLICATIONS

This invention relates to the retrospective pulse modulation systems disclosed and claimed in the copending U.S. patent application, Ser. No. 131,234 of Thomas F. O'Rourke, filed Apr. 5, 1971, entitled "RPM Coding and Decoding Apparatus Therefor," as well as to the other U.S. patent applications referred to therein, all of said applications being assigned to the assignee of this invention.

BACKGROUND OF THE INVENTION

1. Field of the Invention

This invention relates to decoding systems and more particularly to systems for digitally decoding binary data manifested by retrospective pulse modulated marks.

2. Description of the Prior Art

Retrospective pulse modulation and systems therefor are fully disclosed in the above-referenced copending U.S. patent application as well as in other patent applications referenced therein. Broadly, retrospective pulse modulation may be characterIzed as a method for encoding binary data wherein the time or distance separating a first and second mark or pulse is compared to the corresponding time or distance separating the second and a third mark or pulse. Substantially equal elasped times or mark separations represent one binary value while substantially unequal elasped times or separations between marks is representative of a second binary value.

After encoding a series of binary values utilizing this method of retrospective pulse modulation it is, of course, necessary to decode this data into an identical series of binary values. Various methods and apparatus therefor have been heretofore proposed for performing this decoding operation. In one such system, a first ramp voltage generator begins to rise when the first mark is sensed and continues to rise until the second mark is sensed. When the second mark is sensed, a second ramp voltage generator begins to rise and continues to rise until the third mark is sensed. When the third mark is sensed, a differential amplifier compares the two outputs of the ramp voltage generators for a determination of the relative equality or inequality of spacing between the three marks. Such a system, therefore, may be generally described as an analog system having characteristic analog system disadvantages well-known to those skilled in the art, such as the requirement of frequent readjustment.

A digital method heretofore proposed for decoding retrospective pulse modulated data involves generating a pulse train at a predetermined high frequency, counting the pulses which occur between the detection of the first mark and the second mark, counting the pulses which occur between the detection of the second mark and the third mark, and arithmetically comparing these two counts after the third mark is detected to determine the relative equality or inequality of the spacings. This arithmetic computation after the third mark requires a discrete amount of time such that a time limit is reached in the frequency of incoming marks that can be successfully decoded. In other words, there is an inherent speed limitation in such prior art digital decoding systems.

OBJECTS OF THE INVENTION

It is, therefore, an object of this invention to decode retrospective pulse modulated data in an improved manner.

It is another object of this invention to digitally decode retrospective pulse modulated data without making arithmetic computations after the detection of a mark.

It is a further object of this invention to digitally decode retrospective pulse modulated data with time delay after the mark is sensed.

It is yet another object of this invention to digitally decode retrospective pulse modulated data at a faster rate of incoming marks than has heretofore been accomplished.

SUMMARY OF THE INVENTION

The above and other objects are accomplished by generating a series of pulses at a frequency $f/N$. The number of pulses occurring between a first and a second mark, hereinafter referred to as the current count, are counted in an interval counter at the frequency $f/N$. The count accumulated by the time the second mark is reached is representative of the distance between the first and second marks. When the second mark is reached this current count is stored in a register as the previous count. While the interval counter accumulates a new current count between the second and a third mark, a stepping counter is repeatedly stepped at oscillator frequency f with a number of pulses that equals the previous count. This stepping at oscillator frequency $f$ is accomplished in a preferred embodiment below by stepping the ones complement of the previous count in a stepping counter until an end carry occurs. When an end carry occurs, an end carry counter is incremented and the stepping counter is reloaded with the ones complement of the previous count and stepped again, at oscillator frequency $f$, until another end carry occurs. This operation in the stepping counter is repeated until the third mark is reached.

The number of end carries that are counted by the end carry counter is indicative of the ratio of the distance between the second and third marks compared to the distance between the first and second marks. Assuming that the marks are scanned in a substantially continuous manner, if the stepping counter end carried N times, the distance between the second and third marks is equal to the distance between the first and second marks. This is so because the stepping counter is repeatedly stepping a number of pulses equal to the previous count at oscillator frequency $f$, while a new current count is being accumulated at frequency $f/N$ which will equal the previous count, since the distance between the second and third marks is equal to the distance between the first and second marks.

If the stepping counter end carried 2N times between the second and third marks, the distance between the second and third marks is twice the distance between the first and second marks. Since the second distance was twice as long as the first distance, the stepping counter had time to step to the previous count (at oscillator frequency $f$) twice as many times as it woud have taken the stepping counter to step to the previous count if the distance between the second and third marks had equalled the distance between the first and second marks.

To allow for inconsistencies in the scanning rate and inconsistencies in the placement of the marks, the end carry counter is constructed to produce an output signal only when 1.5 N or more end carries occur. At each mark, the presence or absence of an output signal from the end carry counter is stored in a data output circuit. At the next succeeding mark, the presence or absence of an output signal from the end carry counter is compared to its presence or absence at the preceding mark. If the presence or absence of output signals from the end carry counter are in agreement at the two marks, a first binary output signal is produced by the data output circuit. If the output signals of the end carry counter are in disagreement at the two marks, a second binary output signal is produced by the data output circuit.

The foregoing and other objects, features, and advantages of the invention will be apparent from the following more particular description of preferred embodiments of the invention, as illustrated in the accompanying drawings.

DESCRIPTION OF THE PREFERRED EMBODIMENT

Figure 1:
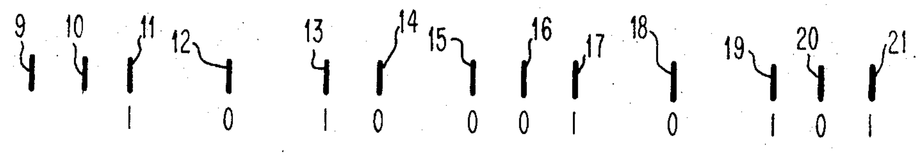
FIG. 1 is a graphic representation of binary information manifested by retrospective pulse modulated marks, wherein the marks are shown as bars.

The principle of retrospective pulse modulation is illustrated in FIG. 1. Information in the form of an eleven order binary number, 10100010101 is coded in this general example. A series of marks in the form of parallel lines 9–21 can be considered as narrow electric pulses established at time intervals proportional to the spacing between the lines 9–21. Alternatively, the marks may be printed lines or bars for optically manifesting the information desired, or at indications of raised or depressed surfaces manifesting the information for mechanical sensing. Further alternatives contemplated are representing the marks as lines of magnetic dipoles or transitions between domains of uniform plurality or as other manifestations by physical form as will occur to those skilled in the art. A start mark or bar 9 is followed at a predetermined spacing by a reference mark 10 for initiating the retrospective modulation. The first information manifesting mark 11 follows the reference mark 10 by a spacing substantially equal to the spacing between the start mark 9 and the reference mark 10 to manifest a binary unit. Obviously, the binary value assigned to this sequence of three substantially equally spaced marks might just as conveniently be defined as a binary naught, depending upon the situation facing the designer.

The following mark 12 is arranged on the former basis to denote a binary naught by spacing mark 12 substantially twice the distance from the preceding mark 11 as mark 11 follows the reference mark 10. In a sense, the information is carried by the spacing between marks. The binary unit is set down at a time at which the spacing between the two preceding marks 9 and 10 is equal to the spacing between marks 11 and 10. Unequal spacing of mark 12 from the preceding mark 11 as compared to the spacing between the reference mark 10 and mark 11 denotes a naught. A binary unit is next denoted by setting down mark 13 at twice the spacing from the preceding mark 12 as was arranged between the start mark 9 and the reference mark 10. Mark 14, following the preceding mark 13 at a spacing smaller than the spacing between the preceding marks 12 and 13 and equal to the spacing between the start mark 9 and the reference 10 denotes a binar naught. Likewise, mark 15 following the preceding mark 14 by a spacing greater than that between the preceding marks 13 and 14 still denotes a binary naught, as will mark 16 following the preceding mark 15 by a shorter spacing. A binary unit is denoted by mark 17 following mark 16 by the same spacing as mark 16 follows mark 15. A binary naught is denoted by mark 18 following the preceding mark 17 by a spacing greater than the mark 17 follows the earlier mark 16. A succeeding mark 19 denotes a binary unit by following the preceding mark 18 by the same larger spacing as mark 18 follows the mark 17. Marks 20 and 21 denote a naught and a unit by following the mark 19 at uniform spacing.

Figure 2:
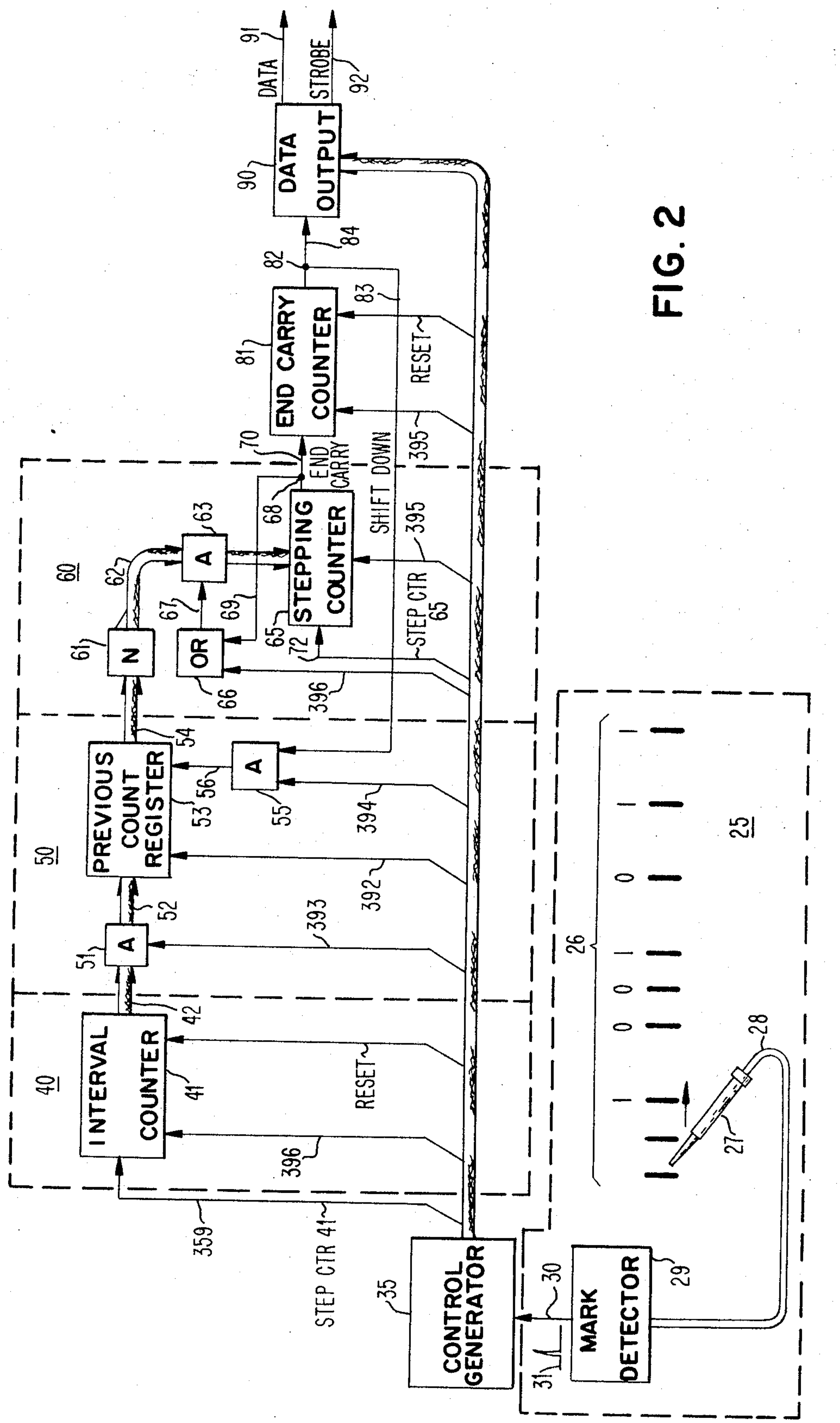
FIG. 2 is a block diagram of the digital system of this invention for decoding retrospective pulse modulated marks.

Referring now to FIG. 2, the digital decoding system of this invention is shown connected to mark sensor 25 for decoding the data manifested by retrospective pulse modulated marks 26. Marks 26 are shown in FIG. 2 as being printed bars which might typically be printed on a document and optically sensed by probe 27 connected by cable 28 to a mark detector 29. Mark detector 29 may typically include a power source for an illumination device in probe 27 as well as an amplifier and a differentiator for providing a signal such as electrical pulse signal 31 when a photosensitive element in probe 27 senses the presence of a mark. It is understood that since optical bar coding is but one of many ways in which data may be manifested by retrospective pulse modulation, mark sensor 25 may take on various other forms. It is important to note that any device which produces a substantially narrow electrical pulse signal at each mark, such as pulse signal 31, may be used for mark sensor 25.

Figure 3:
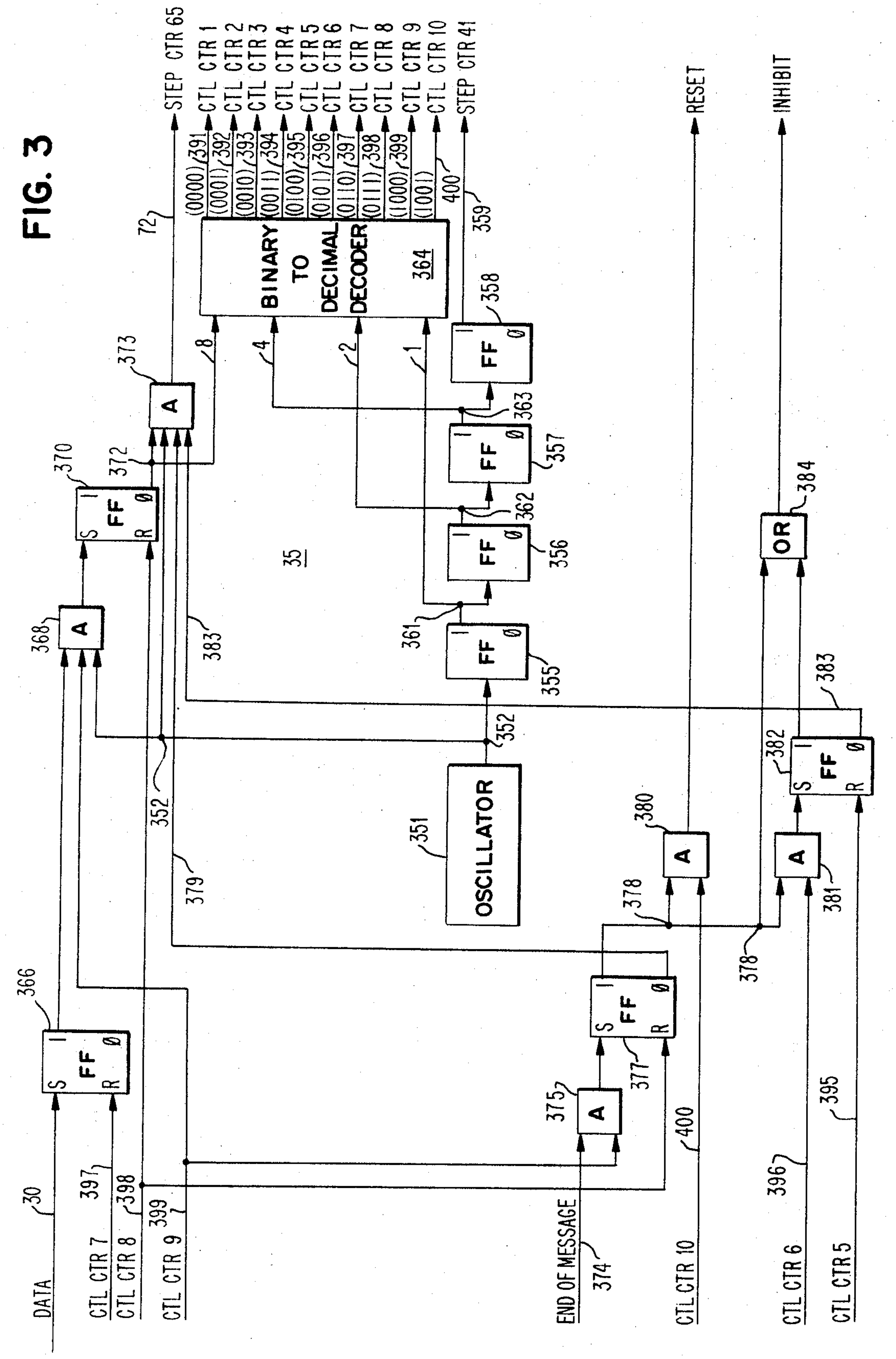
FIG. 3 is a schematic diagram of the control generator portion of the digital decoding system of this invention.

Mark detector 29 of mark sensor 25 is connected to control generator 35 by line 30. Control generator 35 includes an oscillator running at oscillator frequency f and a series of cascaded flip-flops to divide this frequency into a lower frequency *f*/N. The pulses generated at these two frequencies are utilized to step the counters of the system as well as to provide timing signals for operating the various components in the proper sequence. A schematic diagram of control generator 35 is shown in FIG. 3 and will be described in greater detail hereinafter.

Interval sensor 40 includes interval counter 41 for accumulating a count representative of the time or the distance between marks. Said time or distance between marks represents the space between the marks. UPon the sensing of a mark by mark sensor 25, control generator 35 provides a signal on line 396 for resetting interval counter 41. Immediately thereafter, counter 41 is stepped by control generator 35 at the frequency $f$/N by a train of STEP CTR 41 pulses on line 359.

As probe 27 is moved to the right between the first and second of the retrospective modulated marks 26, a count, hereinafter referred to as a current count, is being accumulated in interval counter 41 at a frequency $f$/N. This count continues to increase until the second mark is sensed. Upon the sensing of the second mark an enabling signal is presented on line 393 which enables AND circuit 51 to pass the contents of interval counter 41 along cable 42 through AND circuit 51 into cable 52 to the previous count register 53. Just prior to the passage of the contents of interval counter 41 into previous count register 53, however, register 53 is reset by a signal from control generator 35 appearing on line 392. Just after the contents of counter 41 have been passed into register 53, control generator 35 generates a signal on line 396 to reset interval counter 41.

Assuming that probe 27 continues to be moved toward the right between the second and third marks of retrospective pulse modulated marks 26, interval counter 41 proceeds to accumulate a new, current count representative of the interval of time or distance between the second and third marks. Interval counter 41 always accumulates this current count at the frequency $f$/N by signals from control generator 35 appearing on line 359.

While interval counter 41 accumulates the current count between the second and third marks, the count accumulated between the first and second marks is stored in previous count register 53 of previous count storage 50. Now that a new current count is being accumulated by interval counter 41, the succeeding count accumulated by counter 41 and stored in register 53 is hereinafter referred as the previous count.

Register 53 is connected by cable 54 to inverting circuit 61 for providing the ones complement of the previous count. Inverting circuit 61 is connected by cable 62 to AND circuit 63 for gating the ones complement of the previous count along cable 64 to stepping counter 65. AND circuit 63 is enabled for passing the ones complement of the previous count to stepping counter 65 upon line 67 becoming active, said line 67 being connected to the output of OR circuit 66. OR circuit 66 becomes active upon the presence of a control generator signal on line 396 or a signal on line 69 each time counter 65 performs an end carry.

Inverting circuit 61, AND circuit 63, stepping counter 65, and OR circuit 66 are components of the ones complement stepper 60. Stepping counter 65 of ones complement stepper 60 steps the ones complement of the previous count at the frequency f by pulses from control generator 35 on line 72. Each time stepping counter 65 end carries, stepping counter 65 provides an output signal at node 68. This output signal at node 68 is transmitted along line 69 to OR circuit 66 which, in turn, conditions AND 63 to reload stepping counter 65 with the ones complement of the previous count. Stepping counter 65 is stepped, end carried, and reloaded, at a stepping rate of f, while interval counter 41 continues to accumulate a new current count at the rate of $f$/N. It now becomes obvious that upon reaching the third mark, if the distance between the first two marks is the same as the distance between the second and third marks, stepping counter 65 will have end carried N times. This occurs because stepping the ones complement of the previous count until an end carry occurs is equivalent to stepping from zero up to the previous count or from the previous count down to zero. If the second distance is equal to the first, the same amount of time is now available to step the ones complement of the previous count as was previously required to accumulate this previous count. Since the stepping counter is stepping at N times the interval counting frequency, N end carries will occur between the second and thirds marks. This analysis assumes that probe 27 has been scanning at a constant rate, but irregularities in the scanning rate become neglibible when high counting frequencies are used.

Each time an end carry is performed by stepping counter 65, the output signal provided at node 68 is transmitted to end carry counter 81 along line 70. End carry counter 81 is reset at each mark by line 395 and accumulates a count representative of the total number of end carries between marks 26 generated by stepping counter 65. End carry counter 81 provides an output at node 82 when the contents of end carry counter 81 have exceeded a predetermined number. Thus, end carry counter 81 is a long space counter since an output from said counter indicates that a long space has been sensed. To explain further, assume that two retrospective pulse modulated marks are spaced in either a short space or twice the distance of a short space (a long space). If a long space is detected upon reaching the second of two marks, end carry counter 81 will provide an output signal at node 82. If a short space is detected upon reaching the second of two marks end carry counter 81 will provide no output. Thus end carry counter 81 provides an output when stepping counter 65 has end carried 2N times (for a long space) but no output when stepping counter 65 has end carried only N times. To provide for inconsistencies in scanning rate and inaccuracy in placing the marks at precisely the correct locations to indicate either a short space or a long space, counter 81 is set to provide an output when its contents equal or exceed 1.5N. This output is delivered to data output circuit 90 upon the sensing of each mark.

Since the preferred embodiment of this invention is to be used with a series of retrospective pulse modulated marks wherein the first two marks always represent a short time space, an output from end carry counter 81 is always indicative of the sensing of a long space. This output or the absence thereof is transmitted along line 84 and stored in data output circuit 90 as each mark is sensed. At the sensing of each mark, if end carry counter 81 provides an output indicative of a long interval, this output is conducted along line 83 to AND circuit 55. As soon as the contents of interval counter 41 accumulated during this long interval have been passed into register 53 a signal on line 394 from control generator 35 enables AND circuit 55 to provide an output along line 56 to shift down register 53 to effectively divide the contents of register 53 by 2. By so dividing the contents of register 53, if the next interval is another long interval, stepping counter 65 will again end carry in excess of 1.5N times to cause end carry counter 81 to provide another output indicative of another long interval.

Upon the sensing of each mark data output circuit 90 compares the presence or absence of an output from counter 81 with the stored presence or absence of an output from counter 81 when the preceding mark was sensed. A first binary output signal is provided on line 91 when, at each mark, the present output of end carry counter 81 agrees with the output of end carry counter 81 at the preceding mark. A second binary output signal is provided on line 91 when the present output of end carry counter 81 disagrees with the output of end carry counter 81 at the preceding mark. Thus, a first binary output value is provided when an interval and the preceding interval are both determined to be long or short. A second binary output signal is provided when one of the intervals is long while the other interval is short. Strobe line 92 is connected to control generator 35 to provide a convenient timing signal to activate the input of a circuit (not shown) connected to data line 91.

A schematic diagram of control generator 35 is shown in FIG. 3. Oscillator 351 provides a train of square wave pulses at a frequency $f$ at node 352. This train of square wave pulses at the frequency f is transmitted along line 354 to cascaded T flip-flops 355, 356, 357, and 358 to provide a train of square wave pulses STEP CTR 41 at a frequency $f/16$ on line 359.

Before the first pulse signal appears on line 30 to indicate that a mark has been sensed, assume that all flip-flops have been reset. Since flip-flop 370 has been reset, an output is present at node 372 causing line 8 connected to the binary to decimal decoder 364 to be active. Thus, decoder 364 decodes a binary 1000, then a binary 1001, and then remains idle until the next binary 1000. The outputs of decoder 364 provide signals CTL CTR 1 for a binary input of 0000, through CTR CTL 10 for a binary input of 1001. Therefore, as long as flip-flop 370 remains reset, decoder 364 will provide an output signal CTL CTR 9, then an output signal CTL CTR 10, nd then idle during the time that the binary values of 1010 through 1111 are presented to decoder 364. These signals, CTL CTR 9 and CTL CTR 10 appear on lines 399 and 400, respectively.

When the first mark is sensed, pulse signal 31 on line 30 from mark sensor 25 sets flip-flop 366. When flip-flop 366 is set, AND circuit 368 is enabled at the next CTL CTR 9 signal. Node 352 will be active to an input of AND circuit 368 at every CTL CTR signal, on lines since the CTL CTR signals are derived from oscillator 351. When AND circuit 368 is enabled, flip-flop 370 becomes set which, in turn, deactivates line 8 to binary to decimal decoder 364. This deactivation of line 8 causes signals CTL CTR 1-CTL CTR 8 to be sequentially activated. In order to generate signals CTL CTR 1-CTL CTR 8, decoder 364 receives signals from nodes 361, 362, and 363 along lines 1, 2, and 4 from flip-flops 355, 356, and 357, respectively. These CTL CTR 1-CTL CTR 8 signals appear on lines 391-398, respectively.

When signal CTL CTR 7 occurs on line 397, flip-flop 366 becomes reset, which disables AND circuit 368. When signal CTL CTR 8 appears on line 398, flip-flop 370 becomes reset which provides an output signal at node 372 to be transmitted to decoder 364 on line 8, enabling said decoder to provide signals CTL CTR 9 and CTL CTR 10. Only signals CTL CTR 9 and CTL CTR 10 will be provided by decoder 364 until the next pulse signal appears on line 30 as the next mark is sensed. Thus, a signal on line 30 when a mark is sensed initiates one sequence of signals CTL CTR 1-CTL CTR 8 and at all other times decoder 364 provides only signals CTL CTR 9 and CTL CTR 10.

The remaining logic of control generator 35 shown in FIG. 3 serves to inhibit the flow of pulses to stepping counter 65 until a count has been accumulated between the first two marks. When the system is first actuated or when a predetermined sequence of marks has been decoded an END OF MESSAGE signal appears on input line 374 of AND circuit 375. When CTL CTR 9 signal appears on line 399, AND circuit 375 becomes enabled, which sets flip-flop 377. AND circuit 373 then becomes disabled since no output from the 0 output of flip-flop 377 is present on line 379. Since AND circuit 373 is disabled, no oscillator pulses are presented to stepping counter 65.

Since flip-flop 377 is set, node 378 is active causing OR circuit 384 to become active for presenting an INHIBIT signal to data output circuit 90. When a CTL CTR 10 signal next appears on line 400, AND circuit 380 becomes active to provide a RESET signal for resetting various components of the system as will be explained hereinafter.

Figure 4:
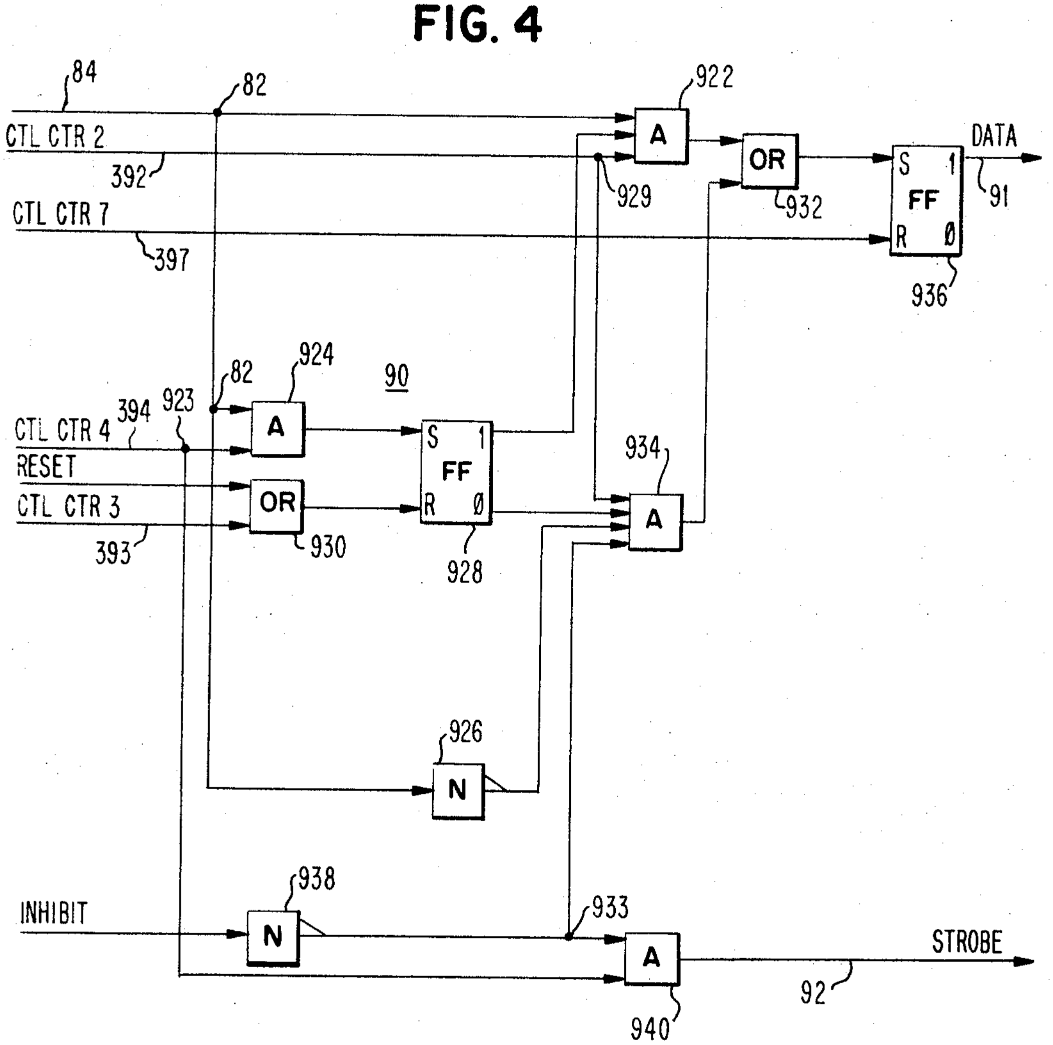
FIG. 4 is a schematic diagram of the data output circuit of the digital decoding system of this invention.

Referring now to FIG. 4, a schematic diagram of data output circuit 90 is shown. At the sensing of each mark after the first mark, data output circuit 90 functions to store the presence or absence of an output signal from end carry counter 81. At the sensing of each succeeding mark, data output circuit 90 compares the current presence or absence of an output signal from end carry counter 81 with the stored presence or absence of mn output signal from counter 81 at the preceding mark. If these respective presences or absences of output signal of counter are in agreement, that is, if there is currently an output signal and there was previously an output signal or if currently there is no output signal and there was previously no output signal, a first binary output signal will be generated by data output circuit 90. If the current and previous outputs of end carry counter 81 are in disagreement, that is, if there is a current output but there was previously no output, or if previously there was an output and currently there is no output, a second binary output signal will be generated by data output circuit 90.

Each time an output signal is generated by end carry counter 81, said output signal is gated through AND circuit 924 to set flip-flop 928. If end carry counter 81 generates another output signal before flip-flop 928 has been reset, said other output signal will be gated through AND circuit 922 and through OR circuit 932 to set flip-flop 936, when a CTL CTR 2 signal enables AND circuit 922. If no output signal is generated by end carry counter 81, flip-flop 928 will be reset and if end carry counter 81 does not generate an output signal at the next mark, AND circuit 934 will be enabled to provide an output signal, gated through OR circuit 932 to set flip-flop 936. Thus, flip-flop 936 becomes set only when the current output and the previous output (stored by flip-flop 928) of end carry counter 81 are in agreement.

OPERATION

Referring again to FIGS. 2, 3, and 4, operation of the digital decoding system will be described relative to the decoding of marks 26 in FIG. 2. Assume that probe 27 will be moved from left to right along marks 26 and that, initially, probe 27 is placed to the left of the first of marks 26. Further, assume that when the system is first activated a power-on reset occurs to reset every flip-flop, counter, nd register. Finally, assume that an END OF MESSAGE signal is present on line 374 (FIG. 3) and will remain present until the first mark is sensed.

While probe 27 remains to the left of the first of marks 26, flip-flop 370 remains reset providing an output signal at node 372 which is transmitted along line 8 to the binary to decimal decoder 364 so that signals CTL CTR 9 and CTL CTR 10 are alternately generated by decoder 364. With the END OF MESSAGE signal present on line 374 AND circuit 375 becomes enabled to set flip-flop 377 when a CTL CTR 9 signal occurs on line 399. When the CTL CTR 10 signal appears on line 400, AND circuit 380 becomes enabled to reset interval counter 41, end carry counter 81, and, through OR circuit 930, flip-flop 928. Since flip-flop 377 is set, OR circuit 384 is enabled to inhibit, through INVERTING circuit 938, AND circuits 934 and 940.

Assuming now that probe 27 is moved substantially continuously to the right, pulse signal 31 is generated when the first of marks 26 is detected. Pulse signal 31 on line 30 sets flip-flop 366 which conditions AND circuit 368 to become enabled at the next CTL CTR 9 signal on line 399. An output from AND circuit 368 sets flip-flop 370 resulting in the absence of an output at node 372. This causes the binary to decimal decoder 364 to generate the sequence of signals CTL CTR 1-CTL CTR 8.

The CTL CTR 2 signal is transmitted to the previous count register 53 via line 392 to reset said register. The CTL CTR 2 signal is also transmitted to AND circuits 922 and 934 of data output circuit 90, but these AND circuits remain inactive because other inputs to them remain inactive.

The CTL CTR 3 signal is transmitted along line 393 to AND circuit 51 to gate the contents of interval counter 41 into the previous count register 53. The CTL CTR 3 signal is also gated through OR circuit 930 to reset flip flop 928 (which was previously reset).

The CTL CTR 4 signal is transmitted along line 394 to AND circuit 55 of previous count storage 50 to enable AND circuit 55 to provide an output along line 56 for performing a shift down (division by 2) in previous count register 53 if an output is present on line 83 from end carry counter 81 indicating that the previous interval was a long space. Since end carry counter 81 has been reset and has received no further input, line 83 is not active at this time. The CTL CTR 4 signal is also transmitted to AND circuits 924 and 940 of data output circuit 90. Presently, neither AND circuit 924 nor AND circuit 940 becomes active since their other inputs remain inactive.

The CTL CTR 5 signal is transmitted along line 395 to reset stepping counter 65 and end carry counter 81. The CTL CTR 5 signal is also used to reset flip-flop 382 (which was previously reset).

The CTL CTR 6 signal is transmitted along line 396 to reset interval counter 41. It should be noted in FIG. 3 that a pulse train at a frequency f/16 has continuously been present on line 359 to advance interval counter 41. Thus, interval counter 41 is again reset by the CTL CTR 6 signal and a count begins in interval counter 41 which will continue until the next mark is sensed when the next CTL CTR 6 signal resets interval counter 41. The count accumulated between these two CTL CTR 6 signals is the current count and is representative of the time required for probe 27 to advance between the two marks.

The CTL CTR 6 signal is also used to enable OR circuit 66 to provide an output along line 67 which enables AND circuit 63 to transfer the ones complement of the previous count stored in previous count register 53 to stepping counter 65. Since interval counter 41 had accumulated some count before previous count register 53 was loaded (at the CTL CTR 3 signal), stepping counter 65 will be loaded with the ones complement of some number. Stepping counter 65 is not being stepped at this time, however, because AND circuit 373 is inactive due to the absence of signals at node 372 and on line 379.

The CTL CTR 6 signal is further utilized to enable AND circuit 381 to set flip-flop 382.

The CTL CTR 7 signal is transmitted along line 397 to reset flip-flop 366 for preparing said flip-flop for the next pulse signal 31 when the second of marks 26 is sensed. The CTL CTR 7 signal is also used to reset flip-flop 936 of the data output circuit 90.

The CTL CTR 8 signal is transmitted along line 398 to reset flip-flop 370. Since flip-flop 370 is reset, an output is produced at node 372 which is transmitted along line 8 to the binary to decinal decoder 364. Resetting flip-flop 370, therefore, places control generator 35 back into the mode wherein decoder 364 emits only alternating CTL CTR 9 and CTL CTR 10 signals. In summary, it is observed that one sequence of CTL CTR 1-CTR 8 signals is produced when each mark is sensed and that these CTL CTR 1 – CTL CTR 8 signals are utilized for timing and controlling the operation of the system. When the CTL CTR 8 signal is produced, flip-flop 370 becomes reset, causing decoder 364 to alternate between CTL CTR 9 and CTL CTR 10 signals until the next mark is sensed. It should be remembered that the CTL CTR pulses occur at oscillator frequency f.

The CTL CTR 8 signal is also used to reset flip-flop 377 which enables one of the inputs of AND circuit 373. AND circuit 373 remains inactive, however, since the input connected to line 383 remains inactive because flip-flop 382 was set at the CTL CTR 6 signal.

As probe 27 continues to move the right between the first and second of marks 26, interval counter 41 continues to accumulate a count representative of the distance between said marks. Stepping counter 65 and end carry counter 81 do not advance since AND circuit 373 has never become active to provide a STEP CTR 65 signal along line 72 to advance counter 65.

Assume now that mark sensor 25 senses the second of marks 26 and produces pulse signal 31 along line 30. Flip-flop 366 becomes set and the next CTL CTR 9 signal enables AND circuit 368 to set flip-flop 370. At this point node 372 becomes inactive and binary to decimal decoder 364 produces CTL CTR 1-CTL CTR 8 signals at oscillator frequency *f*.

The CTL CTR 2 signal along line 392 resets register 53. The CTL CTR 2 signal is also transmitted to node 929 of data output circuit 90. AND circuit 922 remains inactive since its other two inputs are inactive, and AND circuit 934 remains inactive because the INHIBIT signal remains active causing inverting circuit 938 to produce no output at node 933.

The CTL CTR 3 signal along line 393 enables AND circuit 51 to transfer the contents of interval counter 41 into the previous count register 53. This count transferred into previous count register 53 represents the distance between the first and second of marks 26, and, because the second mark has now been reached, the count between the second mark and the one preceding it is now referred to as the previous count. The CTL CTR 3 signal is also gated through OR circuit 930 to reset flip-flop 928 (which was previously reset).

Since end carry counter 81 was never advanced between the first and second marks, no signal will be present on line 83 which is connected to one of the inputs of AND circuit 55. Therefore, the CTL CTR 4 signal, transmitted to the other input of AND circuit 55 along line 394, produces no output on line 56 to shift down previous count register 53. Node 923 in data output circuit 90 becomes active with the presence of the CTL CTR 4 signal, but, AND circuit 924 remains inactive since node 82 is inactive. AND circuit 940 remains inactive since there is no signal at node 933.

The CTL CTR 5 signal is transmitted along line 395 to reset stepping counter 65 and end carry counter 81. The CTL CTR 5 signal also resets flip-flop 382 so that an INHIBIT signal is no longer gated through OR circuit 384. Further, when the CTL CTR 5 signal resets flip-flop 382, the signal produced at its 0 output is conducted along line 383 to AND circuit 373. AND circuit 373 remains inactive however, since flip-flop 370 is set.

The CTL CTR 6 signal resets interval counter 41 conditioning it to accumulate a new, current count between the second and third of marks 26. The CTL CTR 6 signal on line 396 also enables OR circuit 66 to produce an output along line 67 for enabling AND circuit 63 to gate the ones complement of the previous count, stored in register 53, into stepping counter 65. Finally, the CTL CTR 6 signal is present at one of the inputs of AND circuit 381, but said AND circuit remains inactive since its other input, connected to node 378, is inactive.

The CTL CTR 7 signal reset flip-flop 366 to condition it for receipt of the third pulse signal 31 when the third mark is sensed by mark sensor 25. The CTL CTR 7 signal also resets flip-flop 936 (which was previously reset).

The CTL CTR 8 signal resets flip-flop 370 causing node 372 to become active so that decoder 364 is now enabled to produce only CTL CTR 9 and CTL CTR 10 signals. The CTL CTR 8 signal also resets flip-flop 377 (which was previously reset).

All inputs to AND circuit 373 are now active so that AND circuit 373 gates a pulse train at oscillator frequency *f* into line 72 to stepping counter 65. Stepping counter 65, which was loaded with the ones complement of the previous count at the CTL CTR 6 signal, begins advancing at oscillator frequency *f*. When an end carry occurs in counter 65 an output signal is produced at node 68 which is transmitted along line 69 to activate OR circuit 66. An output from OR circuit 66 enables AND circuit 63 to reload stepping counter 65 with the ones complement of the previous count. This loop of loading stepping counter 65 with the ones complement of the previous count, advancing stepping counter 65 until an end carry occurs, then reloading, then advancing, etc., continues at oscillator frequency *f* while interval counter 41 is accumulating a current count between the second and third of marks 26 at a frequency *f*/16. Each time an end carry occurs in stepping counter 65 the output produced at node 68 is carried along line 70 to advance end carry counter 81.

In FIG. 2, the first three of marks 26 are substantially equally spaced. Assuming that probe 27 is moving substantially continuously, 16 end carries should occur in stepping counter 65 between the second and third of marks 26. This is because the process of stepping the one complement of the previous count until an end carry occurs in the same as repeatedly incrementing counter 65 from zero to the previous count at oscillator frequency while the current count is being accumulated at *f*/16. This is also the same as repeatedly decrementing counter 65 from the previous count down to zero at oscillator frequency f while interval counter 41 accumulates the current count at *f*/16. For two succeeding equal spaces between three marks, the ratio of end carries in counter 65 will always equal the ratio of the rate at which the stepping counter is stepped to the rate at which the interval counter is stepped.

As probe 27 continues its movement to the right, the third pulse signal 31 will occur when the third of marks 26 is detected by mark sensor 25. When the third mark is detected, pulse signal 31 sets flip-flop 366 enabling AND circuit 368 to set flip-flop 370 so that binary to decimal decoder 364 produces signals CTL CTR 1-CTL CTR 8.

THe CTL CTR 2 signal along line 392 clears register 53. The CTL CTR 2 signal is also transmitted to node 929 of data output circuit 90. All inputs to AND circuit 934 are now active so that the output from AND circuit 934 is gated through OR circuit 932 to set flip-flop 936 so that a data output signal appears on line 91. (AND circuit 934 becomes active since node 929 is active, flip-flop 928 remains reset, node 82 remains inactive so that INVERTING circuit 926 produces an output, and since no INHIBIT signal is present, INVERTING circuit 938 produces an output at node 933.)

The CTL CTR 3 signal along line 393 enables AND circuit 51 to transfer the contents of interval counter 41 into previous count register 53. The contents of interval counter 41 so transferred represent the distance between the second and third of marks 26. Because the third mark has now been reached the count between the third mark and the second mark is now referred to as the previous count. The CTL CTR 3 signal is also gated through OR circuit 930 to reset flip-flop 928 (which was previously reset).

Since the distance between the first and second of marks 26 is always a short space in this embodiment, and because the distance between the second and third of marks 26 is, in FIG. 2, substantially the same as the distance between the first and second of marks 26, an insufficient number of end carries was accumulated in end carry xounter 81 to produce an output signal at node 82 by the time the third mark is reached. Therefore, no signal will be present on line 83 which is connected to one of the inputs of AND circuit 55. Because of this the CTL CTR 4 signal transmitted to the other input of AND circuit 55 produces no output of line 56 to shift down previous count register 53. The CTL CTR 4 signal, however, enables AND circuit 940 in data output circuit 90 to become active to produce a strobe pulse on line 92 to serve as a timing signal to activate the input of a circuit (not shown) connected to data line 91.

The CTL CTR 5 signal resets stepping counter 65 and end carry counter 81. The CTL CTR 5 signal also resets flip-flop 382 (which was previously reset).

The CTL CTR 6 signal resets interval counter 41 conditioning it to accumulate a new, current count between the third and fourth of marks 26. The CTL CTR 6 signal also enables OR circuit 66 to produce an output along line 67 enabling AND circuit 63 to gate the ones complement of the previous count, stored in register 53, into stepping counter 65. The CTL CTR 6 signal is also present at one of the inputs of AND circuit 381 but said AND circuit remains inactive since its other input, connected to node 378 is inactive. (AND circuit 381 will remain inactive until an END OF MESSAGE signal is generated to enable AND circuit 375 to set flip-flop 377 so that a signal is provided at the other input to AND circuit 381.)

The CTL CTR 7 signal resets flip-flop 366 for preparing said flip-flop for the next pulse signal 31 when the fourth of marks 26 is sensed. The CTL CTR 7 signal also resets flip-flop 936 of data output circuit 90.

The CTL CTR 8 signal resets flip-flop 370 in control generator circuit 35. This enables AND circuit 373 to gate the train of oscillator pulses along line 72 to stepping counter 65 for stepping the ones complement of the previous count stored in register 53. Resetting flip-flop 370 also places control generator 35 back into the mode wherein decoder 364 emits only alternating CTL CTR 9 and CTL CTR 10 signals.

Probe 27 continues moving to the right toward the fourth of marks 26 while a current count accumulates in interval counter 41 representative of the distance between the third and fourth of marks 26. The current count accumulates in interval counter 41 at a frequency *f*/16. While this happens, stepping counter 65 repeatedly is loaded with the ones complement of the previous count (which was accumulated in interval counter 41 between the second and third of marks 26) and stepped at oscillator frequency *f* until end carries occur. Since the distance between the third and fourth of makrs 26 is twice the distance between the second and third of marks 26, probe 27 should take about twice as long to travel between the third and fourth marks as it took to travel between the second and third marks. Stepping counter 65, therefore, will end carry about twice as many times between the third and fourth of marks 26 as it did between the second and third of marks 26. Since end carry counter 81 is preset to provide an output whenever the number of end carries representative of 1.5 times a short space occurs, end carry counter 81 will be providing an output by the time the fourth mark is reached. The output will occur because the distance between the third and fourth marks is a long space. End carry counter 81 will always produce an output after a long space has been sensed.

Because, from now until the end of the message represented by marks 26, control generator 35 will continue to respond the same as was explained when the second and third marks were reached, the remaining analysis of the decoding of marks 26 will be focused upon data output circuit 90, end carry counter 81, previous counter register 53, and AND circuit 55, which react differently depending on whether long or short spaces are detected.

As stated above, when the fourth mark is reached, an output signal from end carry counter 81 will be present at node 82. The CTL CTR 2 signal does not enable AND circuit 922, however, since flip-flop 928 is reset. Further, since a signal is present at node 82 no output signal is produced by INVERTING circuit 926 so that AND circuit 934 does not become enabled. Therefore flip-flop 936 does not become set and no data output signal appears on line 91.

When the CTL CTR 4 signal appears, both inputs to AND circuit 924 are now active so that an output from AND circuit 924 sets flip-flop 928. The signal present at node 82 is transmitted along line 83 to AND circuit 55. Therefore, when the CTL CTR 4 signal appears, AND circuit 55 becomes active to produce a signal along line 56 to shift down previous count register 53 which divides the contents of register 53 by 2. It is observed that the previous count stored in register 53 which is divided by 2 is the count accumulated between the third and fourth of marks 26, since this count was gated into register 53 by AND circuit 51 when the CTL CTR 3 signal appeared.

Finally, since the CTL CTR 2 signal at the fourth mark did not set flip-flop 936 (and since flip-flop 936 was reset with CTL CTR 7 signal at the third mark) no data output signal is transmitted along line 91 when the CTL CTR 4 signal at the fourth mark enables AND circuit 940 to produce a strobe pulse on line 92.

Probe 27 continues moving to the right between the fourth and fifth of marks 26. During this time, interval counter 41 is accumulating a current count representative of the space between the fourth and fifth of marks 26 at a frequency *f*/16. Simultaneously, stepping counter 65 is being repeatedly loaded with the ones complement of the previous count (which was divided by 2) and stepped at oscillator frequency *f* until end carries occur.

When the fifth of marks 26 is reached, no output signal from end carry 81 will be present at node 82, because the distance between the fourth and fifth of marks 26 is a short space so that less than 1.5N end carries occurred while probe 27 traveled between the fourth and fifth of marks 26. Since no output signal is present at node 82, when the CTL CTR 2 signal is generated at the fifth mark, AND circuit 922 does not become enabled to produce an output to be gated through OR circuit 932 to set flip-flop 936. Neither does AND circuit 934 become enabled to produce an output to be gated through OR circuit 932 to set flip-flop 936, because flip-flop 928 was set at the CTL CTR 4 signal produced by the fourth of marks 26.

The CTL CTR 3 signal produced at the fifth mark is gated through OR circuit 930 to reset flip-flop circuit 928. Also, the CTL CTR 3 signal enables AND gate 51 to transfer the previous count, accumulated in interval counter 41 between the fourth and fifth of marks 26, into previous counter register 53.

Since no output is present at node 82, when the CTL CTR 4 signal provides an input to AND circuit 56, no shift down occurs in previous count register 53 because no signal is present on line 83 to AND circuit 55. Since the CTL CTR 2 signal at the fifth mark did not set flip-flop 936, no data output signal is transmitted along line 91 when the CTL CTR 4 signal at the fifth mark enables AND circuit 940 to produce a strobe pulse on line 92.

As probe 27 continues to the right between the fifth and sixth of marks 26, interval counter 41, stepping counter 65, and end carry counter 81 continue to increment. When the sixth mark is reached, end carry counter 81 will not be producing an output signal at node 82 because the distance between the fifth and sixth of marks 26 is short space. When the CTL CTR 2 signal is generated at the sixth of marks 26 all inputs to AND circuit 934 will be active so that the output from AND circuit 934 is gated through OR circuit 932 to set flip-flop 936 providing an output signal on data line 91. When the CTL CTR 4 signal is generated at the sixth pulse, AND circuit 940 is enabled to produce a strobe pulse on line 92 for timing out the output signal on data line 91. No shift down occurs in register 53 at the CTL CTR 4 signal since no output signal from end carry counter 81 is present on line 83.

The CTL CTR 7 signal resets flip-flop 936 of data output circuit 90.

When probe 27 reaches the seventh of marks 26 an output signal from end carry counter 81 will be present at node 82 because of the long space between the sixth and seventh of marks 26. When the CTL CTR 2 signal is generated at the seventh mark, neither AND circuit 922 nor AND circuit 934 become active to produce an output to be gated through OR circuit 932 to set flip-flop 936. AND circuit 922 is not enabled because flip-flop 928 is reset. AND Circuit 934 is not enabled because the signal present at node 82 causes INVERTING circuit 926 to produce no output to AND circuit 934.

When the CTL CTR 3 signal is generated at the seventh mark the contents of interval counter 41 are gated through AND circuit 51 into previous count register 53. This previous count is representative of the long space between the sixth and seventh of marks 26. At the CTL CTR 4 signal AND circuit 55 becomes enabled to provide an output along line 56 for shifting down the previous count stored in register 53, dividing said count by 2. The CTL CTR 4 signal also enables AND circuit 924 to provide an output for setting flip-flop 928. Since flip-flop 936 was reset with the CTL CTR 7 signal at the sixth of marks 26, no output signal is present on line 91 when the CTL CTR 4 signal at the seventh mark enables AND circuit 940.

When probe 27 reaches the eighth of marks 26, an output from end carry counter 81 will again be present at node 82 since the distance between the seventh and eighth of marks 26 is a long space. When the CTL CTR 2 signal is generated at the eighth space, AND circuit 922 becomes active to produce an output signal to be gated through OR circuit 932 for setting flip-flop 936, providing an output signal on line 91. When the CTL CTR 3 signal is generated at the eighth of marks 26, AND circuit 51 becomes enabled to transfer the contents accumulated in interval counter 41 between the seventh and eighth of marks 26 into previous count register 53. The CTL CTR 3 signal is also gated through OR circuit 930 to reset flip-flop 928.

Since a signal is present on line 83, AND circuit 55 becomes enabled at the CTL CTR 4 signal to shift down the previous count stored in register 53 (accumulated between the seventh and eighth of marks 26). The CTL CTR 4 signal at the eighth mark also enables AND circuit 924 to provide an output for setting flip-flop 928. Further, the CTL CTR 4 signal enables AND circuit 940 to provide a strobe pulse on line 92 for timing out the output signal present on data line 91.

The CTL CTR 7 signal generated at the eighth mark resets flip-flop 936.

When the ninth mark is reached there will, again, be an output signal from end carry counter 81 present at node 82. When the CTL CTL 2 signal is generated at the ninth mark, AND circuit 922 will become enabled to produce an output signal to be gated through OR circuit 932 to set flip-flop 936 providing an output signal on data line 91.

The CTL CTR 3 signal generated at the ninth of marks 26 is gated through OR circuit 930 to reset flip-flop 928. The CTL CTR 3 signal also enables AND circuit 51 to transfer the contents of interval counter 41 accumulated between the eighth and ninth of marks 26 into previous count register 53. The CTL CTR 4 signal generated at the ninth mark enables AND circuit 55 to produce an output along line 56 to shift down register 53, dividing the previous count stored therein by 2. The CTL CTR 4 signal also enables AND circuit 924 to produce an output for setting flip-flop 928. Further the CTL CTR 4 signal enables AND circuit 940 to produce a strobe pulse on line 92 for timing out the output signal present on data line 91.

The CTL CTR 7 signal generated at the ninth pulse resets flip-flop 936.

A series of retrospective pulse modulated marks of any variety (electrical signals, printed bars, etc.) of any length may be decoded in this manner. Each time a long space is detected an output will appear at node 82 of data output circuit 90. If a short space is detected, no signal appears at node 82. Flip-flop 928 stores the presence or absence of an output signal at node 82 at each mark so that said presence of absence may be compared with the presence or absence of said signal at the next succeeding mark. If two long spaces were detected, AND circuit 922 provides an output to be gated through OR circuit 932 to set flip-flop 936 providing an output signal on data line 91. Since flip-flop 928 stores the presence or absence of a signal at node 82 when the preceding space was reached, AND circuit 934 becomes enabled when, at two successive marks, no signal is present at node 82. This is indicative of two short spaces. When AND circuit 934 becomes enabled with the presence of two succeeding short spaces an output signal produced thereby is gated through OR circuit 932 to set flip-flop 936, providing an output along data line 91. When two successive signals along line 82 are in disagreement, flip-flop 936 remains reset so that no output signal is provided on data line 91.

While the invention has been particularly shown and described with reference to preferred embodiments thereof, it will be understood by those skilled in the art that various changes in form and details may be made therein without departing from the spirit and scope of the invention. For example, it is recognized that a simple design alteration, within the skill of the art, would enable the system to decode data wherein the space between the first two marks in the message defines a long space rather than a short space as described in the preferred embodiment above.

What is claimed is:

1. A system for decoding data manifested by retrospective pulse modulated marks comprising:

control generator means for generating stepping counter pulses at a frequency *f* and interval counter pulses at a frequency *f*/N;

interval counting means connected to said control generator means and advanced by said interval counter pulses for accumulating a current count between a first mark and a second mark;

register means connected to said interval counting means for storing said current count as a previous count while another current count is being accumulated be-tween the second mark and a third mark;

stepping counter means connected to said register means and to said control generator means, said stepping counter means being repeatedly stepped with a number of stepping counter pulses equal to the previous count, said stepping counter means providing an output signal each time it has been stepped said number of pulses equal to the previous count;

long space counter means connected to said stepping counter means for providing an output signal when the number of output signals from said stepping counter means has exceeded a predetermined number between two marks;

output circuit means connected to said long space counter means for storing each output signal from said long space counter means and for providing at each mark, a first binary data output when the output of said long space counter means agrees with the output of said long space counter means stored in said data output circuit at the preceding mark.

2. A system for decoding data manifested by the relative spacing between retrospective pulse modulated marks, wherein the space between the first two marks in a series of marks defines a short space comprising:

control generator means for generating stepping counter pulses at a frequency *f* and interval counter pulses at a frequency *f*/N;

interval counting means connected to said control generator means and advanced by said interval counter pulses, said interval counting means being responsive to the sensing of said marks for accumulating a current count between a first mark and a second mark;

register means connected to said interval counting means for storing said current count as a previous count while another current count is being accumulated between the second mark and a third mark;

stepping counter means connected to said register means and said control generator means, said stepping counter means being repeatedly stepped with a number of said stepping counter pulses equals to the previous count, said stepping counter means providing an output signal each time it has been stepped said number of pulses equal to the previous count;

long space counter means connected to said stepping counter means for providing an output signal when the number of output signals from said stepping counter means has exceeded a predetermined number between two marks;

output circuit means connected to said long space counter means for storing each output signal from said long space counter means and for providing, at each mark, a first binary data output when the output of said long space counter means agrees with the output of said long space counter means stored in said data output circuit at the preceding mark.

3. The system for decoding data as described in claim 2 further comprising:

means for dividing said previous count stored in said register means by two, said means being operable in response to an output signal from said long space counter means after said register means is storing the latest previous count.

4. The system for decoding data as described in claim 2 wherein said register means includes a shift register in which said previous count is stored and further includes means operable in response to an output signal from long space counter means to shift said shift register for dividing said previous count stored therein by approximately two after said shift register is storing the latest previous count.

5. A system for decoding data manifested by the relative spacing between retrospective pulse modulated marks, wherein the space between the first two marks in a series of marks defines a short space comprising:

control generator means for generating stepping counter pulses at a frequency *f* and interval counter pulses at a frequency *f*/N;

interval counting means connected to said control generator means and advanced by said interval counting pulses, said interval counting means being responsive to the sensing of said marks for accumulating a current count between a first mark and a second mark;

register means connected to said interval counting means for storing said current count as a previous count while another current count is being accumulated between the second mark and a third mark;

ones complementing means connected to said register means for providing the ones complement of said previous count;

stepping counter means connected to said ones complementing means and said control generator means, said stepping counter means being repeatedly stepped with the ones complement of the previous count, said stepping counter means providing an output signal each time an end carry occurs in said stepping counter means;

end carry counting means connected to said stepping counter means for providing an output signal when the number of output signals from said stepping counter means has exceeded a predetermined number between two marks;

output circuit means connected to said end carry counter means for storing each output signal from said end carry counter means and for providing at each mark, a first binary data output when the output of said end carry counter means agrees with the output of said end carry counter means stored in said data output circuit at the preceding mark.

6. A system for decoding data manifested by the relative spacing between retrospective pulse modulated marks, wherein the space between the first two marks in a series of marks defines a short space, comprising:

mark sensing means providing an output in response to the sensing of a mark;

control generator means for generating stepping counter pulses at a frequency *f* and interval counting pulses at a frequency *f*/N, said control generator means being further operable in response to the sensing of a mark for providing a single sequence of timing pulses;

interval counting means connected to said control generator means operable in response to said sequence of timing pulses for accumulating a current count of said counting pulses representative of the interval between two marks;

register means connected to said counting means and said control generator means operable in response to said sequence of timing pluses for storing a previous count of said interval counting means, said previous count being defined as the current count in said interval counting means immediately before said interval counting means is reset;

stepping counter means connected to said register means and said control generator means operable in response to said sequence of timing signals for stepping the ones complement of said previous count stored in said register means with said stepping counter pulses, said stepping counter means being reloaded with the ones complement of said previous count stored in said register means each time an end carry occurs;

end carry counting means connected to said control generator and said stepping counter means operable in response to said sequence of timing signals for counting the number of end carries performed by said stepping counter means, said end carry counting means providing an output signal when its contents have exceeded a predetermined number, said output signal shifting said register means for dividing the contents of said register means by approximately 2 after said register means has been loaded with the latest previous count;

data output circuit means connected to said end carry counter means and said control generator means operable in response to said sequence of timing signals for storing the presence or absence of an output signal from said end carry means and being further operable in response to said sequence timing signals for providing a first binary data output when the present output of said end carry counter means agrees with the presence or absence of an output from said end carry means stored in said data output circuit means at the preceding sequence of timing signals, said data output circuit means further providing a second binary output when the present output of said end carry counter means disagrees with said output of said end carry counter means stored in said data output circuit means at the preceding sequence of timing pulses.

7. A process for decoding data manifested by the relative spacing between retrospective pulse modulated marks, wherein the space between the first two marks in a series of marks defines a short space, comprising the steps of:

generating stepping counter pulses at a frequency $f$ and interval counter pulses at a frequency $f/N$;

sensing each mark;

counting the number of interval counter pulses that occur between the sensing of a first mark and a second mark;

storing said number of interval counter pulses as a previous count while another number of interval counter pulses which occur between the sensing of the second and a third is counted;

counting the number of sequences of said stepping counter pulses that occur between the sensing of said second mark and said third mark, said sequence of said stepping counter pulses being defined as a number of said stepping counter pulses equal to said previous count;

generating a long space output signal when the number of said sequences exceeds a predetermined number;

storing said long space output signal when each mark is sensed;

generating a first binary data output when the presence of a long space output signal compares with the presence of a long space output signal stored at the preceding mark.

8. The process for decoding data as described in claim 7, comprising the additional step of:

generating a first binary data output when the absence of a long space output signal compares with the absence of a long space output signal stored at the preceding mark.

* * * * *